UNITED STATES PATENT OFFICE.

OTTO ERNST, OF HÖCHST-ON-THE-MAIN, GERMANY, ASSIGNOR TO FARB-WERKE, VORM. MEISTER, LUCIUS & BRÜNING, OF HÖCHST-ON-THE-MAIN, GERMANY, A CORPORATION OF GERMANY.

MONOAZO DYE AND PROCESS OF MAKING SAME.

SPECIFICATION forming part of Letters Patent No. 714,882, dated December 2, 1902.

Application filed September 4, 1901. Serial No. 74,317. (No specimens.)

*To all whom it may concern:*

Be it known that I, OTTO ERNST, Ph. D., a citizen of the Empire of Germany, residing at Höchst-on-the-Main, Germany, have invented certain new and useful Improvements in the Manufacture of Red Monoazo Dyestuffs Suitable for the Preparation of Lakes, of which the following is a specification.

This invention relates to the manufacture of a dyestuff by combining diazotized para-nitranilin-ortho-sulfonic acid with beta-naphthol. I have found that the azo dyestuff which may be thus obtained is highly suitable for the preparation of insoluble color-lakes fast to water, acid, lime, and light, being distinguished by these valuable properties, especially that of fastness to light, from the ponceaux of corresponding shade used in the manufacture of lakes. The dyestuff similar in shade obtained from para-nitranilin-ortho-sulfonic acid has also various advantages when compared with the dyestuff obtained from diazotized para-nitranilin and beta-naphthol. First of all, the dyestuff has not the property of dissolving in oil, which permits of a more extended application than is the case with the dyestuff obtained from para-nitranilin. Further, the new dyestuff may be obtained as such, being afterward transformed into lakes, whereas the dyestuff from para-nitranilin must be produced directly as a lake, which is very inconvenient in the manufacture of lakes, because by this process it is more difficult to obtain uniform results than is the case with finished dyestuffs.

The manufacture of the new dyestuff is illustrated as follows: 1.2 kilos of ammonium nitranilin-ortho-sulfonate are diazotized in a dilute solution of hydrochloric acid by nitrite, avoiding a considerable excess of hydrochloric acid. The diazo compound is then slowly run into a solution of 0.75 kilos of beta-naphthol in the equivalent quantity of soda-lye and 0.35 kilos of sodium carbonate.

The dyestuff obtained from para-nitranilin-ortho-sulfonic acid forms a red precipitate of metallic luster. It is very slightly soluble and may be completely separated by adding a little common salt. The dyestuff being soluble with difficulty in water it is best to employ it as paste. With alkaline earths and metallic salts the dyestuff forms intensely-colored lakes of a pure-red shade and of remarkable fastness to light, especially the said color-lakes are far superior to those obtained from known azo dyestuffs of a similar shade.

Having now described my invention, what I claim is—

1. The herein-described process of making a red monoazo dyestuff for the preparation of color-lakes, which consists in combining the diazo compound of para-nitranilin-ortho-sulfonic acid with beta-naphthol, substantially as set forth.

2. As a new product, the red monoazo dyestuff obtained as herein described, being when dry a brick-red powder soluble with difficulty in water and forming according to the usual methods color-lakes of red shades of remarkable fastness, especially to light, substantially as set forth.

In testimony that I claim the foregoing as my invention I have signed my name in presence of two subscribing witnesses.

OTTO ERNST.

Witnesses:
ALFRED BRISBOIS,
HEINRICH HAHN.